United States Patent

[11] 3,617,942

[72] Inventors Arjeh J. Kurtzig
   Short Hills;
   Roy Conway LeCraw, Madison; Raymond Wolfe, Union, all of N.J.
[21] Appl. No. 876,685
[22] Filed Nov. 14, 1969
[45] Patented Nov. 2, 1971
[73] Assignee Bell Telephone Laboratories, Incorporated
   Murray Hill, N.J.

[54] IRON BORATE DEVICES
   7 Claims, 2 Drawing Figs.
[52] U.S. Cl. .................................. 332/7.51,
   23/60, 350/151
[51] Int. Cl. .................................. G02f 1/22

[50] Field of Search.......................... 350/141;
   332/7.51; 252/62.58; 23/59, 60

[56] References Cited
   UNITED STATES PATENTS
   3,480,409  11/1969  Dillon et al. ............. 332/7.51 X Primary Examiner—Rodney D. Bennett, Jr.
Assistant Examiner—Daniel C. Kaufman
Attorneys—R. J. Guenther and Edwin B. Cave ABSTRACT: Iron borate ($FeBO_3$) evidences a magneto-optic effect of device interest over a broad frequency range including parts of the visible spectrum. Modulators and isolators, either continuous or pulsed, may be operated over this entire frequency range at room temperature.

INVENTORS
A. J. KURTZIG
R. C. LECRAW
R. WOLFE

BY

ATTORNEY

IRON BORATE DEVICES

BACKGROUND OF THE INVENTION

1. Field of the Invention

The invention is concerned with elements for use in the isolation and modulation of electromagnetic wave energy at frequencies including those of the visible spectrum and extending into the infrared. Ultimate use for such elements is, inter alia, in communication systems, switching systems, and memory arrays, and for these purposes such energy is ordinarily coherent. Elements of the type with which this invention is concerned operate on the magneto-optic principle. They generally depend for their operation upon the magnetic rotation which is imposed upon polarized wave energy resulting from impression of a magnetic field ordinarily having a component in the wave-propagation direction. Other magneto-optic devices depend on magnetically induced birefringence, or, more generally, on induced changes in refractive index.

2. Description of the Prior Art

Magneto-optic materials have previously been proposed for the device uses with which this invention is concerned. Probably the first practical material so applied was yttrium iron garnet (YIG), and for several reasons, this material and compositional modifications remain the most promising candidates.

Unfortunately, the high frequency absorption edge for YIG is below the red end of the visible spectrum, and, accordingly, YIG is not a useful modulator material in the visible light spectrum. A recognized need exists for modulator materials which will operate with visible light. Coherent light sources operating at wavelengths in the visible spectrum include helium-neon operating at 6,328 A. units, the second harmonic of YIG-neodymium at 5,324 A. units, and argon at 4,880 A. units.

The need has been sufficient that each newly discovered magnetic material with any measurable transparency in the visible has been examined with a view to the possibility of modulation. Materials which have been examined with this in view include europium oxide (EuO) and chromium tribromide ($CrBr_3$). However, no commercially practical materials have yet emerged.

Two new magnetic materials with transparency in the visible spectrum have been proposed for use in magneto-optic devices. These materials are rubidium iron fluoride ($RbFeF_3$) and thallium iron fluoride ($TlFeF_3$). Announcement of the suitability of these transparent magnetic materials for device use was favorably received by workers in the field and experimental devices have been constructed. As significant as these materials are, however, their value is somewhat diminished by their low Neel points requiring refrigerating at or below liquid-nitrogen temperatures.

More recently, a magnetic material with transparency in the visible spectrum and a Curie point well above room temperature was reported (Vol. 169, Physical Review Letters, p. 465, May, 1968). This material appears quite promising for certain device uses and development work is proceeding.

While $FeF_3$ may satisfy some device needs, it is evident that an interest continues to exist in the discovery of new transparent room-temperature magnetic materials having device properties.

SUMMARY OF THE INVENTION

In accordance with the invention, it has been discovered that ferric borate, $FeBO_3$, below its Curie point of 350° K., is weakly ferromagnetic (canted antiferromagnetic) with transparent windows extending from a wavelength of above 5,000 A. to at least 3 microns. The material has exhibited its ability to rotate plane polarized electromagnetic radiation in such regions when magnetically saturated. Relevant devices include an otherwise conventional modulator configuration in which a magnetically saturated crystal of $FeBO_3$ is so arranged that the magnetization direction is altered so as to change the magnitude of the magnetization component in a light-propagation direction.

For certain uses, the high crystalline birefringence of the material may prove an obstacle (as in the instance of a rotator where rotation may be restricted to an angle of a few degrees). Should a greater rotation be desired, such may be accomplished by stacking oppositely oriented crystalline sections so as to cancel the crystalline birefringent contribution.

DETAILED DESCRIPTION

The Drawing

As noted, the crystaline birefringence of this material effectively reduces the degree of rotation which may be obtained in a single crystal section. Broken lines 11 represent an optional arrangement whereby platelets of opposite orientation are stacked so that ordinary and extraordinary ray paths are exchanged in succeeding sections 12. Such a stacked array may be treated as a low-birefringence or nonbirefringent, single crystal in its entirety and will so operate as a conventional magneto-optic modulator.

Figure 1:
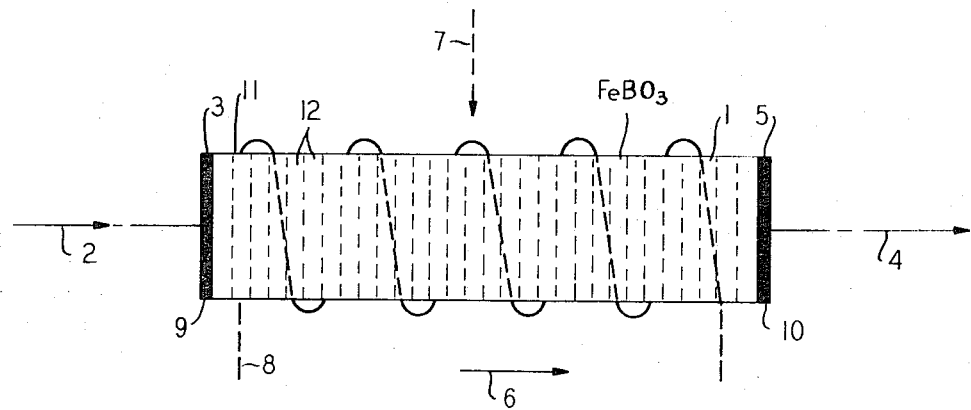
FIG. 1 is a front elevational view of a device in accordance with the invention using a crystalline body of iron borate ($FeBO_3$)

In FIG. 1, the element shown consists of crystalline body 1 of $FeBO_3$. Provision is made for introduction of a plane polarized beam 2 of electromagnetic energy of a wavelength within the transparency range of $FeBO_3$ at surface 3 and for extraction of an exiting beam 4 at surface 5. The orientation of the crystal is ordinarily such that transmission is along a $<11\bar{2}0>$ or $<10\bar{1}0>$ direction. The reasons for this selection is discussed in detail under "General Properties of $FeBO_3$."

Application of a magnetic field of such magnitude as to magnetically saturate the platelets of body 1 and in such direction as to produce a magnetization component in the beam transmission direction results in rotation of the beam within the medium of body 1. Such magnetization component is schematically indicated by arrow 6. Where component 6 is of fixed magnitude, the device of FIG. 2 may serve as an isolator.

The following portion of the description is discussed in terms of the exemplary embodiment utilizing a series of stacked platelets. It is to be understood, however, that device design is not so limited; and simple, single crystal elements may be utilized for various purposes such as phase modulation and even including that of a Faraday rotation device (although in the latter case the degree of rotation is limited as noted).

Proper selection of crystal length and/or magnetization direction such as to result in an appropriate component 6 may produce a rotation of 45°. Since magnetic rotation is nonreciprocal, any returning energy, as may be produced by reflection from surface 5, is polarized normal to the polarization of the incoming beam 2.

The device of FIG. 1 may also be operated as a modulator. In such operation, the magnitude of parallel magnetic component 6 is altered in accordance with a modulating signal. Such operation may be achieved by application of a field schematically depicted as arrow 7 which may be orthogonal to the beam direction and which is of sufficient magnitude to magnetically saturate body 1 in the direction in which it is applied. The modulating current may be passed through an encircling winding 8. The varying modulating field so produced has the effect of tilting the magnetization so as to result in a component 6 of varying magnitude. For reasons which will be discussed, a desired operating mode includes application of the orthogonal field 7 in a $<10\bar{1}0>$ or $<11\bar{2}0>$ crystallographic direction. Operation of the device of FIG. 1 as a modulator is further described. Body 1 is magnetically saturated in this illustrative case by a normal magnetic field 7. The field applied may advantageously exceed the value required to saturate in order to increase the magnetic resonance frequency and to increase this limit on frequency as is well known. In this mode of operation, a plane polarized light beam 2 propagated normal to the magnetization direction resulting from field 7 (and, for usual operation, desirably polarized parallel to or perpendicular to field 7 to avoid magnetically induced birefringence effects) introduced at surface 3 passes through body 1 unchanged. Introduction of current through winding 8 tilts the magnetization thus resulting in a component 6 in the light-transmission direction. The magnitude of this component determines the degree of rotation or of phase change or of frequency change depending upon the system. Regardless of the mode of operation, the degree of modulation may be enhanced by use of optionally partially reflecting surfaces 9 and 10. The resulting cavitation permits retention of the light beam for a given statistical number of passes during each of which the modulation is increased. Since the degree of modulation for a given crystal length for a single pass varies only as the square root of the power, the advantage from this standpoint is significant.

It has been indicated that the modulator may be operated in such manner as to result in phase change or in frequency change. Such alternative modes are well known. In a representative device, such alternative modes may use circularly polarized electromagnetic wave energy. For such a beam, variation in the length of magnetization component 6 effectively alters the path length. It is also possible to operate such a modulator in such a way as to depend o the magnetically induced birefringence rather than the gyromagnetic activity introduced by the field. This operation is similar to that of an electro-optic modulator. In such a device, modulation, whether phase, amplitude, or frequency, may be achieved by use of plane polarized energy, as is well understood.

Other device uses for transparent magnetic materials are known. They include displays, memories, and holograms. All depend on refractive index or rotational changes for transmitted or partly transmitted light (all based on magnetization direction whether local or overall). A hologram configuration uses random particles of magnetic material in an index-matched matrix. Such a device, described in U.S. application Ser. No. 827,389, filed May 23, 1969, depends on random orientation to cancel out birefringence and on crystalline anisotropy for remanence. Memory "bits" are sensed in rotation associated with a given polarization. The inventive materials may be used in any such device.

Figure 2:
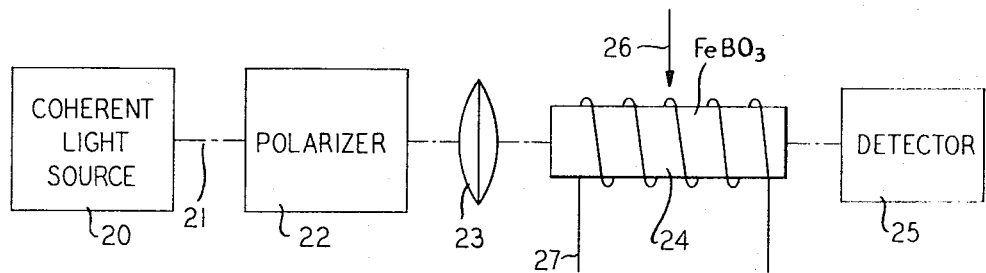
FIG. 2 is schematic representation of a coherent light system utilizing a device of the invention as a modulator.

FIG. 2 is merely illustrative of otherwise well-known systems useful for communications and other purposes. The apparatus of this figure consists of coherent light source 20 producing light beam 21, which passes through plane polarizer 22, focusing means 23, $FeBO_3$ modulator 24 and detector 25 in succession. An applied field 26 having a component normal to the light transmission direction (in common with the preferred mode of operation of all modulators of this invention) desirably maintains body 24 magnetically saturated. Modulating current introduced through winding 27 results in rotation of the plane polarized light beam to a degree dependent upon the magnitude of the component of magnetization lying in the transmission direction. In common with other modulation apparatus, the relative polarization directions of elements 22 and 25 depend upon the desired mode of operation. They may be crossed so as to block transmission in the absence of a modulating current, or they may be parallel to permit maximum transmission in the absence of modulating current. They may be at some intermediate angle for biased linear CW (continuous wave) operation, or, for one illustrative mode of digital operation which, while resulting in some loss, may take advantage of a rotation of less than 90°.

Alternate modes of operation are known. They include, for example, application of a DC field at some angle other than orthogonal to the beam direction. They include also the use of a completely reflecting end surface at the termination of the beam transversal path so as to result in a double pass device. Such mode of operation, of course, requires some means for separating the incoming and outcoming energy. Such means may include a Wollaston prism, and, depending upon crystal length and other operating conditions, may also include a static rotator. Such alternate arrangements are not considered a necessary part of this description.

General Properties of $FeBO_3$

Rhombohedral $FeBO_3$ is a clear green crystal. Transparent windows extend from the green wavelength ($\sim 5000$ Å) down past 3 microns.

Iron borate ($FeBO_3$) has a Curie temperature of approximately 350° K. above which it is paramagnetic. Below this temperature, magnetic ordering is that of a canted antiferromagnetic. Crystallographically, $FeBO_3$ is rhombohedral. In accordance with convention, the material is treated as though it were hexagonal and the optic axis is accordingly designated [0001]. Easy directions lie in the plane normal to the optic axis, i.e., the basal plane or (0001). In accordance with this convention, the six major directions in the plane normal to the optic axis are designated $<11\bar{2}0>$, $<10\bar{1}0>$.

General device design considerations suggest the use of the [0001] axis as the beam direction in devices dependent on magnetic rotation. This direction is generally desirable because the static (or crystalline) birefringence is zero and no crystal stocking is required. Largely from the standpoint of simplicity of design, this may also be the preferred beam direction for a device owing its operation to magnetically induced birefringence. Light beam transmission along a $<11\bar{2}0>$ or $<10\bar{1}0>$ direction would be preferable (as stated above) if crystals are to be stacked in order to minimize the affects of crystalline birefringence.

A usual operational mode would suggest the use of a saturating magnetic field applied normal to the beam direction. For the induced birefringence device, the applied field may be rotated within the plane normal to the beam between adjacent $<11\bar{2}0>$ and $<10\bar{1}0>$ directions.

For more sophisticated devices, it is desirable to keep the crystal magnetically saturated at all times during operation. Some device designs may, however, permit one of the states to correspond with absence of an applied field. For most purposes, however, light scattering produced at domain walls is generally to be avoided.

For usual operation, the rotational device requires a varying magnetization component in the beam direction. This is commonly accomplished by imposing a magnetic field in the beam direction as by a current passed through an encircling winding. The degree of rotation is linearly related to the magnitude of the magnetization component parallel to the light beam.

The anisotropy of the system may suggest digital operation for a light beam direction parallel to the optic axis.

The orientations considered from a device standpoint above, while specific, are intended to be illustrative only. Other beam and field directions may be advantageous for particular modes of operation. Saturation magnetization values are temperature dependent particularly as the Curie point is approached. The measured value of $4\pi M_S$ is 115 gauss at room temperature. Typical devices may be operated with applied fields of this order of magnitude.

From the physical and chemical standpoint, $FeBO_3$ is durable and unaffected by ordinary atmospheric materials. It is sufficiently hard so that it can be cut and polished to produce optically flat surfaces.

From the compositional standpoint, the magnetic properties, upon which this invention is based, are associated with the particular composition $FeBO_3$. Some modification of this composition is possible and may be desirable to alter different device properties. It has been observed that the compositions $CoCO_3$ and $MnCO_3$ are isostructural with $FeBO_3$, and it follows that a range of solid solutions of the compounds may be prepared. To this end, isocompounds may be incorporated—from a magnetic standpoint, to increase or otherwise change the Curie temperature, or—optically to move the peak transmission to a different wavelength from the green associated with $FeBO_3$.

Other inclusions, including impurities, may be tolerated generally to a maximum of about 1 percent by weight. A possible impurity is lead or boron resulting from the flux inclusion or incomplete conversion of the starting compound. Any starting materials retained are largely that of a diluent.

Preparatory Technique $FeBO_3$ was grown from a $Bi_2O_3$ flux. Starting materials were $Fe_2O_3$ and $B_2O_3$. An illustrative preparatory procedure follows:

A 7.5- by 7.5-cm. platinum crucible containing 200 grams of $B_2O_3$, 200 grams of $Bi_2O_3$ and 70 grams of $Fe_2O_3$ was heated to 1,150° C. and maintained at that temperature for 2 hours in air. Subsequently, crucible and contents were cooled at a rate of 2° C. per hour to a temperature of 600° C., after which they were permitted to cool by removal from the furnace. The grown crystals were removed from the now solidified flux by use of dilute $HNO_3$. The product contained single crystals of the approximate dimension 2 mm. by 2 mm. by 2 mils. Crystals were of a high degree of perfection and transparent emerald green in appearance. Magnetic properties, including Faraday rotation studies and other properties reported herein, were consistent with those reported elsewhere in this disclosure.

What is claimed is:

1. Magneto-optic device comprising a crystalline body of a ferromagnetic material evidencing transparency for electromagnetic wave energy, first means for magnetically saturating the said crystal, and second means for introducing and extracting a beam of coherent polarized electromagnetic wave energy, characterized in that the said crystal consists essentially of $FeBO_3$.

2. Device of claim 1 in which said second means is at least one optically polished surface.

3. Device of claim 1 in which the beam propagation direction through the said crystal approximately corresponds with a [0001] crystallographic direction.

4. Device of claim 1 in which the beam propagation direction through the said body approximately lies in a (0001) plane.

5. Device of claim 1 in which the direction of magnetization results in part from imposition of a first magnetic means applied normal to the beam direction and in part from an additional means for tilting the magnetization.

6. Device of claim 1 in which the body is made up of a series of single crystal sections.

7. Device of claim 6 in which a plurality of sections lie in a light beam direction and in which the sections lessen birefringence for the beam.

* * * * *